Aug. 28, 1956　　O. A. KERSHNER　　2,760,615
HIGH CAPACITY SEALED CLUTCH
Filed Aug. 7, 1951　　4 Sheets-Sheet 1

INVENTOR.
O. A. Kershner
BY Robb & Robb
attorneys.

Aug. 28, 1956  O. A. KERSHNER  2,760,615
HIGH CAPACITY SEALED CLUTCH
Filed Aug. 7, 1951  4 Sheets-Sheet 2
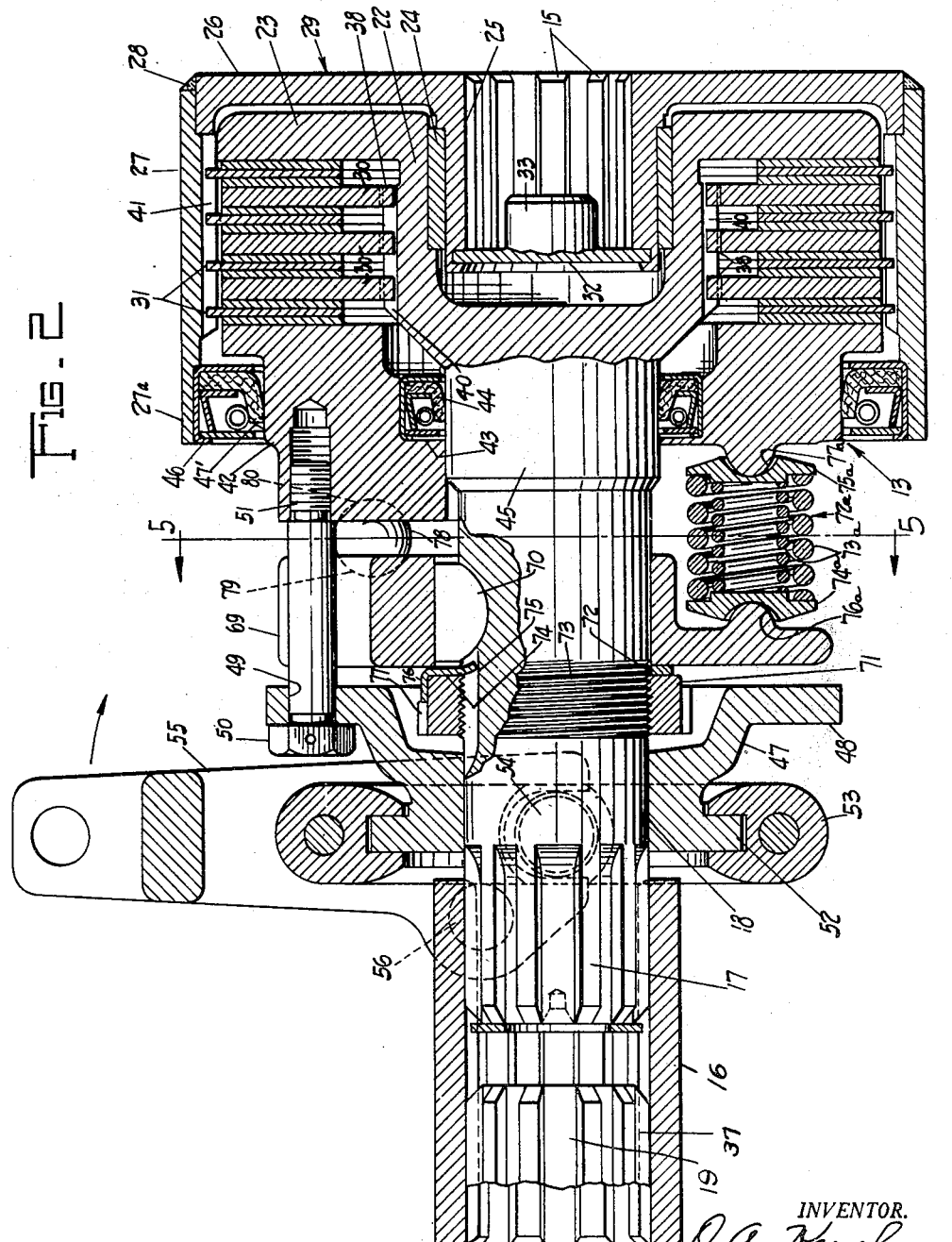

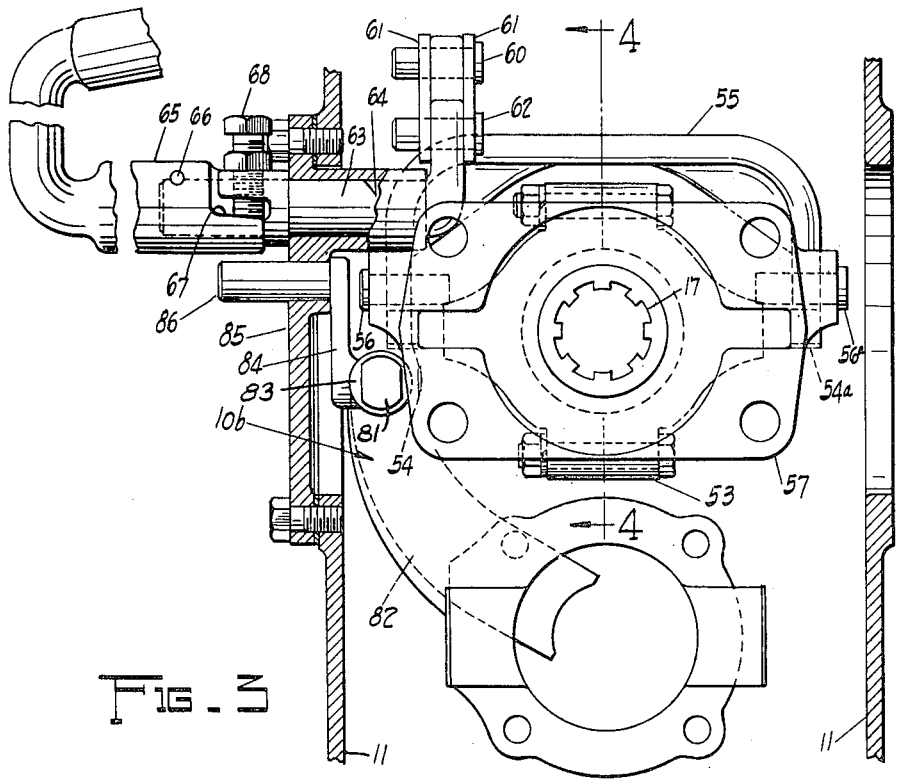
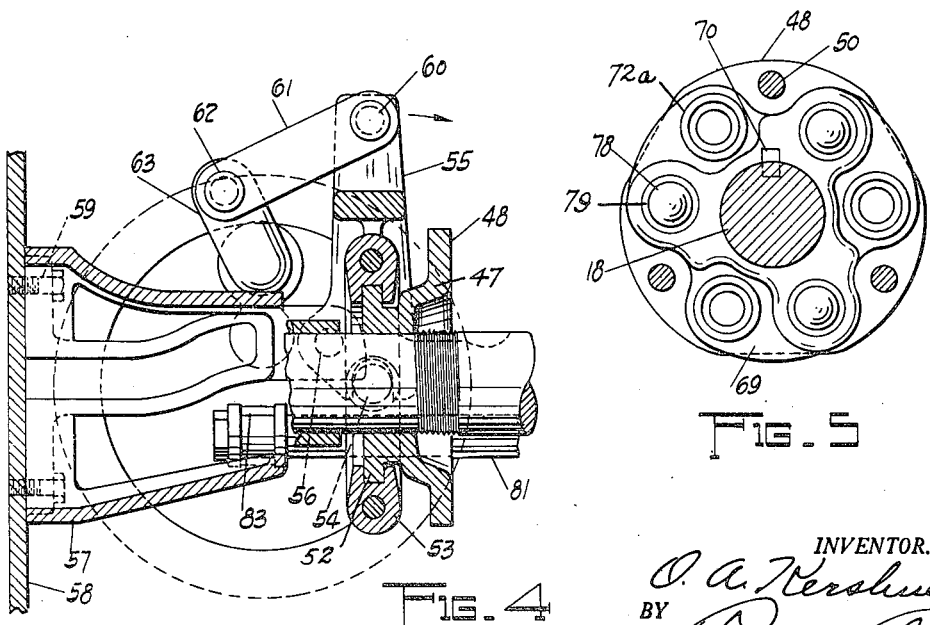

Aug. 28, 1956  O. A. KERSHNER  2,760,615
HIGH CAPACITY SEALED CLUTCH
Filed Aug. 7, 1951  4 Sheets-Sheet 4

INVENTOR.
O. A. Kershner
BY Robert Cobb
Attorneys

United States Patent Office 2,760,615
Patented Aug. 28, 1956

2,760,615

HIGH CAPACITY SEALED CLUTCH

Osborn A. Kershner, St. Joseph, Mich., assignor, by mesne assignments, to Lambert Brake Corporation, St. Joseph, Mich., a corporation of Michigan Application August 7, 1951, Serial No. 240,639

9 Claims. (Cl. 192—69)

This application is a continuation-in-part of my co-pending application filed April 26, 1950, Serial No. 158,229, now abandoned.

The present invention relates to a high capacity sealed clutch of the type which is broadly disclosed in the aforementioned co-pending application, and more particularly, to such a clutch which is small in size but relatively strong and durable.

In many types of apparatus, power is transmitted through an environment of oil and/or the space limitations restrict the size of any power transmitting clutch which may be utilized. Where space restrictions are involved in such apparatus, wet clutches of adequate capacity usually cannot be employed without resorting to alteration or redesign of the transmission system, often at great expense, so it is therefore desirable to provide a small but exceptionally powerful clutch which is capable of dry operation in an oil environment.

Accordingly, it is a primary object of the present invention to provide a compact, high capacity clutch which may be availed of for various installations, such as:

(1) In automatic power transmission mechanisms for braking the large reversing ring gear;

(2) In truck transmissions to provide a live power take-off for such equipment as a refrigerator unit for refrigerated trucks, or in any other transmission wherein it is desirable to provide for continuous operation of a power take-off regardless of interruption of the main chain of power through the transmission;

(3) In connection with driving pumps such as are used on fuel oil and gasoline trucks, or lift pumps for hydraulic tail gates;

(4) In certain marine installations, such as marine reduction gear drives, or wherein it is desired to provide uninterrupted drive for certain auxiliary equipment regardless of interruption of the main power chain; and (5) In machine tool installations having definite space limitations in such apparatus, wherein the clutch of this invention is of great advantage because of its high capacity for its small size.

Another object is to provide a small, compact, powerful, and efficient clutch which inludes inter-leaved clutch plates which are cooperatively engaged with a clutch shaft and a clutch housing for transmitting power between a power input and a power output shaft, the clutch being effectively sealed against the admission of oil or other fluid therein, thus assuring dry operation of the clutch in an oil or other fluid environment.

A further object is to provide a high capacity sealed clutch which is approximately one-third the size of conventional wet clutches of the same torque capacity, thus providing a clutch unit which is ideally suited for installation in oil-containing power transmission housings, particularly in such transmission housings wherein the available space is incapable of accommodating a conventional wet clutch, and thereby avoiding the necessity of enlarging the transmission housing, or otherwise modifying the conventional transmission assembly.

One illustrative embodiment and advantageous installation of the clutch of this invention will be hereinafter described in detail, wherein the clutch is installed in a conventional oil-containing transmission housing of a farm tractor which is adapted to operate auxiliary equipment, such as a combine or the like, by means of a power take-off shaft which derives its power from the same power source that drives the tractor. Such an installation permits the power to the drive wheels of the tractor to be interrupted without interrupting the chain of power to the combine or other auxiliary equipment. This is an extremely desirable operating relationship in the case of combines if, during the combining operation, a large bundle of the grain happens to collect on the combine platform, since the bundle will slug and stop the combine unless some means is provided to prevent further loading thereof. This slugging and stopping may be prevented by stopping forward motion of the tractor through disengagement of the clutch of this invention without interrupting operation of the power take-off shaft, thus allowing uninterrupted operation of the combine until the platform is cleared. Subsequent re-engagement of the clutch will effect resumption of travel of the tractor.

It is readily apparent that the application of the clutch of this invention to the transmission of a farm tractor is only one of many useful ways in which the present clutch invention may be availed of, since, as noted in the foregoing, it can be employed generally in power transmission mechanism which either may or may not include an oil-containing housing, without affecting the effectiveness of the clutch, and without necessitating any substantial alteration of the existing conventional transmission assembly.

Other and further objects and advantages of the invention will be hereinafter set forth and the novel features thereof defined by the appended claims.

In the drawings:

Figure 2 is a vertical sectional view of the clutch device of the invention, showing in detail certain elements thereof, including the sealing instrumentalities and other parts of the clutch mechanism;

Figure 3 is a view, partly in elevation and partly in section, showing the operating means for the clutch and the location of the same in relation to the transmission drive housing;

Figure 4 is a view, partly in elevation and partly in section taken on the line 4—4 of Figure 3, showing the clutch actuating linkage and the supports therefor;

Figure 5 is a view, partly in elevation and partly in section taken on the line 5—5 of Figure 2, showing the location of the pressure spring and balls of the servo portion of the clutch;

Figure 1:
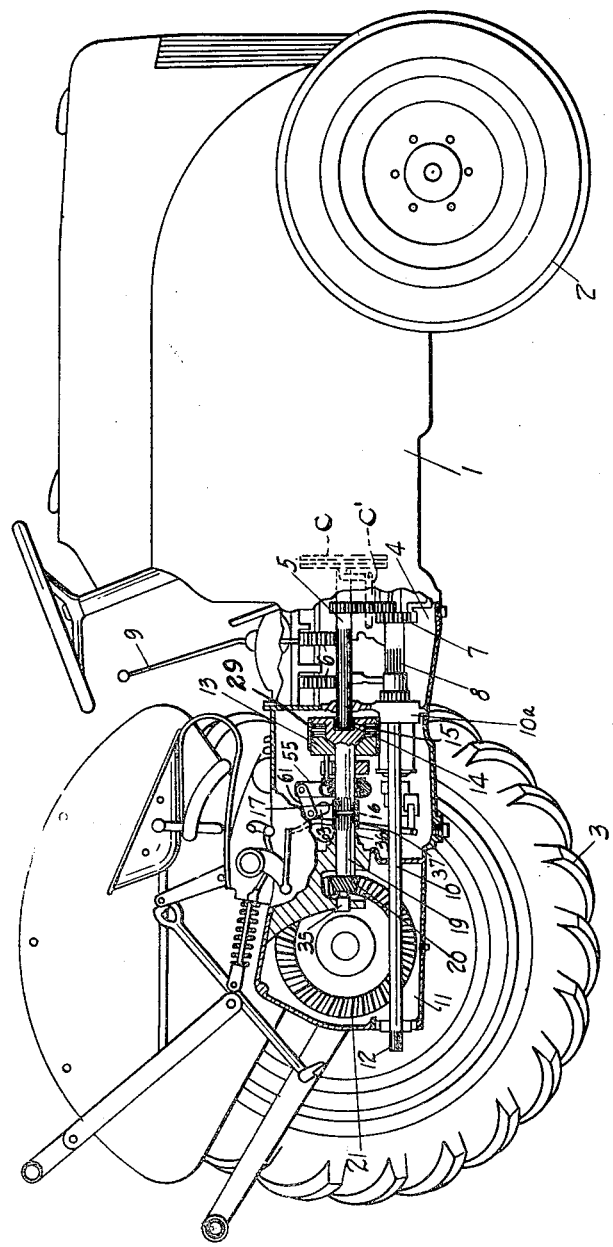
Figure 1 is a view, partly in elevation and partly in section, showing the clutch device of the invention mounted in tractor transmission in its operative relation to the drive mechanism therefor.

Like reference characters designate corresponding parts in the several figures of the drawings, wherein in Figure 1, a wheeled tractor unit 1 of a known type, into which the clutch of this invention may be incorporated, is shown as being supported on front wheels 2 and rear wheels 3. A change-speed-gear transmission 4 connected in the usual manner to the engine of the vehicle 1, includes a main drive shaft 5, supporting gears 6 thereon and in splined relation therewith for driving engagement with the usual gears 7 of a power take-off gear shaft 8.

The said last-named shaft is generally called a cluster gear shaft in the transmission, and in this particular invention is adapted to be connected to a power take-off shaft, in a manner to be hereinafter set forth. The gears 6 on the drive shaft 5 transmit the engine power to the traction wheels 3, through the change-speed transmission 4, said transmission being equipped with a shift lever 9 for operation in the usual manner when the main engine clutch C is disengaged by suitable control means C'. The power of the engine is delivered to a power take-off drive shaft 10 extending rearwardly of the vehicle 1, through a rear axle and differential housing 11, and having a splined portion 12 thereon, for connection to a machine to be driven thereby. The power take-off shaft 10 is provided with a positive drive in-and-out clutch of known construction (not illustrated in detail) located at 10a of Figure 1 and controlled by a suitable arm and lever mechanism 10b (Figure 3).

Adjacent to the rear end of the drive shaft 5 is the clutch unit generally designated 13, of the invention, to be hereinafter more specifically described, as shown in detail in Figure 2. The shaft 5 is provided with a male splined portion 14, for engagement with the female spline 15 of the clutch unit 13. A female spline member 16 is provided for connecting the clutch unit 13, as by means of a male spline portion 17 formed on a shaft 18 of said unit 13, said female spline member 16 being connected to a suitable male portion of a stub drive shaft 19. The stub shaft 19 is provided with a suitable pinion gear 20 adjacent its rear end, engaged with the usual ring gear 21 of the differential drive mechanism of the tractor, for transmitting the engine power to the rear wheels 3 of the tractor in the usual manner.

As shown in Figure 2, the shaft 18 is formed with an enlarged hollow hub 22 at one end thereof and is provided adjacent to its end with circular flange member 23 formed integrally therewith and comprising a part of the clutch means to be described in detail hereinafter.

Rotatably mounted within the hub 22, in a suitable bearing 24, is a mating hub 25, which is formed with a circular flange 26. The flange 26 is suitably fixed to an annular member 27 by welding thereto as at 28, whereby a housing generally designated 29 is provided for the clutch plates 30 and discs 31.

Adjacent its inner end, the hub 25 is fitted with a disc member 32 sealingly engaged with an opening therein, the disc 32 being formed with a thrust shoulder 33. The hub 25 is further provided with the spline 15, previously referred to, for engagement with the spline portion 14 of the shaft 5 hereinbefore described.

From the foregoing it will be seen that the clutch unit 13 is thus supported at one end by engagement of the spline portion 14 of the shaft 5 and the splines 15 of the housing 29. The shaft 19, being carried in bearings 35 and 36, supports the clutch unit 13 at its opposite end through engagement of splines 37 thereon in driving relation therewith, by means of the female spline member 16 and male spline 17 on the shaft 18.

The clutch plates 30 previously referred to, are formed with notches 38 to engage with the splines 40 on the hub 22, enabling movement of the plates longitudinally of the hub 22. Inter-leaved with the plates 30 are the discs 31, formed with circumferentially spaced notches for co-action with splines 41 within the annular member 27 of the housing 29.

A pressure plate 42, substantially ring-like in conformation, is formed with an inner annular opening 43, an oil seal 44 of suitable known construction being pressed therein, for sealing engagement with the peripheral surface of a shoulder 45 on the shaft 18. The annular member 27 of the housing 29, is provided at its open end 27a with a similar oil seal 46 pressed therein, and sealingly engaging the peripheral surface of a shoulder 47' on the periphery of the pressure plate 42 referred to above.

From the foregoing it will be seen that an oil tight housing for the clutch plates 30 and discs 31 is provided, whereby the said plates and discs are effectively and completely sealed from the entrance of oil or other lubricating media since they are enclosed by the housing 29 and pressure plate 42 in conjunction with the seals 44 and 46.

A clutch thrust or throw-out plate 47, of substantially frusto-conical form, is rotatively supported on shaft 18 and includes a flange portion 48 adapted to receive in suitable openings 49 therein, bolts 50 having the heads thereof abutting the flange 48 beforementioned. The said bolts 50 are provided with threads 51 for screw engagement with the pressure plate 42. The thrust or release plate 47 is additionally provided with an annular flange 52, for engagement with a throw-out collar 53 pivotally connected at 54 and 54a to a throw-out lever 55. The lever 55 is a yoke-like member whose ends are pivotally connected at 56 and 56a with a supporting member 57 (see Figure 4), the supporting member 57 in turn being secured to a stiffening partition 58 of the differential housing 11 by suitable bolts 59.

Adjacent to the upper end of the throw-out lever 55 and pivotally connected therewith by a pin 60, are links 61. The links 61 are in turn connected as by means of a pin 62, with a bell-crank lever 63. The bell-crank lever 63 is supported in a bearing 64 of the housing 11. Adjacent to its outer end the lever 63 is connected to a foot pedal crank 65 (see Figure 3), said crank being provided with a suitable socket for connection to the bell-crank 63 and being pinned to the same by pin 66. The crank 65 is also formed with a cam stop 67 adapted to coact with adjusting means 68 in a manner well known in the art.

Referring again to Figure 2, it will be seen that intermediate the release plate 47 and the pressure plate 42, a spring backing member 69 is supported on the shaft 18 and extends therearound, being keyed to said shaft by a key 70. The member 69 is adjustable longitudinally on the shaft 18 to compensate for wear, by means of the lock nut 71 which is provided with threads 72 therein for engagement with corresponding threads 73 on the shaft 18 aforesaid. A suitable lock washer 74 for said nut 71, formed with a tongue 75 positionable in the keyway for the key 70, and an ear 76 for engagement in a slot 77 of the lock nut 71, is provided to maintain said lock nut in its adjusted position.

Intermediate the member 69 and the pressure plate 42 previously referred to, clutch loading spring units 72a are provided. Said units 72a are comprised of compression springs 73a engaging caps 74a and 75a having recesses therein adapted to coact with bosses 76a and 77a formed on the member 69 and the pressure plate 42 respectively, in a manner to be hereinafter set forth. The spring units are normally in expanded condition to maintain the pressure plate 42 in position for transmission of driving force through plates 30 and discs 31 and flange 23 of hub 22 on the shaft 18.

A servo action of the pressure plate 42 is availed of in the clutch unit 13. The said servo action is effected by the use of hardened balls 78 interposed between said plate 42 and the member 69, the balls 78 being seated in suitable nearly conical recesses 79 and 80 in said member and plate, respectively.

In view of the foregoing, it will be seen that a slight rotation of the plate 42 in respect to the shaft 18, will cause a separation of the said plate 42 and member 69 due to the camming action of the balls 78 on the surfaces of the recesses 79 and 80 of those parts. This action will cause pressure additional to that of the spring units 72a, to be exerted on the pressure plate 42, whereby the plates 30 and discs 31 are still more firmly maintained in frictional engagement. Since the member 69 is restrained from longitudinal movement on the shaft 18 by the lock nut 71, and rotation on the shaft by the key 70, it may be considered as being relatively immovable on the said shaft 18 for the purposes of the action just above described.

The arm and lever mechanism 10b previously mentioned as controlling the in-and-out clutch mechanism generally designated 10a (not shown in detail) (see Figures 3 and 4) includes a longitudinally shiftable shaft 81 having fixed thereto at one end, an arm 82, for engagement with one of the clutch members of the in-and-out clutch unit, and at its other, end, a yoke 83 carried by a bell-crank 84. The bell-crank 84 is supported in a bearing formed with the cover 85 fastened to the housing 11. It will be clear that any suitable lever may be fixed to the end 86 of said bell-crank 84 for operation in a manner well known in the art and operation thereof may be effected to cause the shaft 81 to move back and forth in the housing 11, whereby the in-and-out clutch may be caused to connect and disconnect the power take-off shaft 10 and the gear shaft 8.

A tractor vehicle in which the clutch of this invention is installed is operated as follows:

With the main engine clutch C disengaged, the in-and-out clutch generally denoted 10a is then engaged for rotation of the power take-off shaft, which is connected with any suitable mechanism on the vehicle or implement being towed by the said tractor, for example, a combine for grain or the like. The shift lever 9 having been previously set for the desired forward speed, the main engine clutch is then re-engaged in the usual manner. As the tractor proceeds and the combine being towed thereby picks up grain or the like, the combine very often picks up more grain than can be threshed, causing an overloading of the machine as hereinbefore set forth. At this point it is desirable to enable stopping of the forward movement of the tractor while permitting the threshing operation of the towed vehicle to continue. The operator therefore presses the foot pedal 65 (Figure 3) causing the release lever 55 to move, through links 61 in the direction of the arrow (Figure 4 and Figure 2). As seen in Figure 2, this movement is transferred, through the lever 55, pivoted at 56 and connected with the throw-out collar 53, to the release plate 47. Plate 47, therefore, moves to the left, as seen in Figure 2, and the bolts 50 engaged with said plate 47, transmit the movement to the pressure plate 42, at the same time compressing the spring units 72a. The result will be a decrease of pressure on plates 30 and discs 31 whereby relative rotation of the housing 29 and the unit comprised of the shaft 18, the hub 22 and the flange 23, will be effected. From the foregoing it is apparent that the driving force normally transmitted by the engine through the change-speed gear mechanism to the rear wheels 3 of the tractor, will be discontinued and the forward motion thereof will cease. The power take-off shaft 10 will continue to rotate, thus maintaining operation of the mechanism on the towed vehicle, whereby it may clear itself of accumulated grain, for example, without further picking up additional grain.

Conversely, when the accumulated grain has been cleared from the towed machine, the operator of the tractor will release the pedal 65, permitting the spring units 72a to expand and force the plate 42 into engagement with the plates 30 and discs 31 of the unit 13 and thereby re-establish driving engagement of the drive shaft 5 through the housing 29, flange 23, plates 30, discs 31 and hub 22, and shaft 18, the latter transmitting the engine power to the shaft 19 and through the pinion 20 to the ring gear 21 and thence to the rear driving wheels 3.

Increasing load on the engine of the tractor will be seen to cause a tendency of the plates 30 and discs 31 to slip relative to one another, and thus rotate the pressure plate 42. Slight rotation of the plate 42 will cause the balls 78 to move slightly relative to the plate 42 and the member 69, whereby the camming action previously described takes place, and positive pressure contact of the plates 30 and discs 31 is restored and increased thereby.

From the foregoing it will be apparent that an efficient clutch unit has been provided for incorporation in the power transmission drive of a tractor vehicle, with the clutch operating in an environment of oil, i. e., the transmission gear lubricant. It should be understood, however, that the clutch described in the foregoing may, without departing from the spirit of this invention, be utilized in any installation wherein it is desired to interrupt a chain of power which may or may not pass through an environment of oil or other fluid. On the other hand, however, it should also be understood that the clutch of this invention is not necessarily limited to use in an installation wherein the space limitations require a small, but efficient clutch of high torque capacity.

Figure 6:
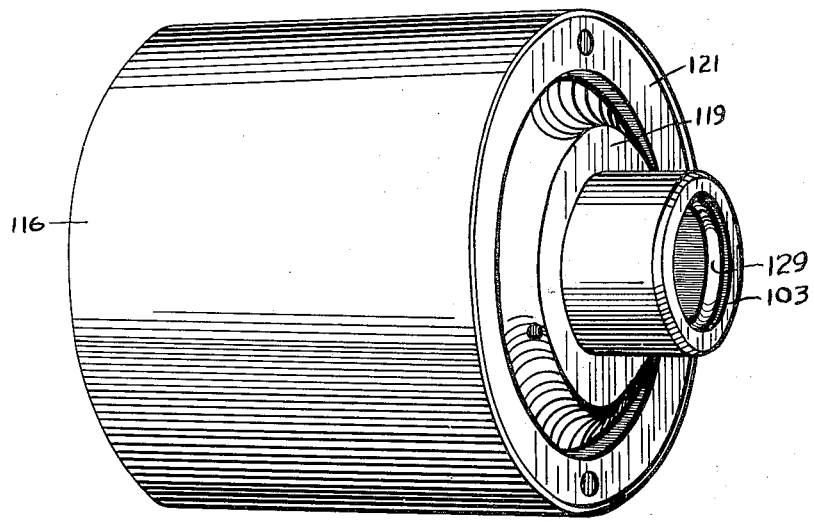
Figure 6 is a view in perspective of a modified form of sealed clutch made in accordance with the present invention.
Figure 7:
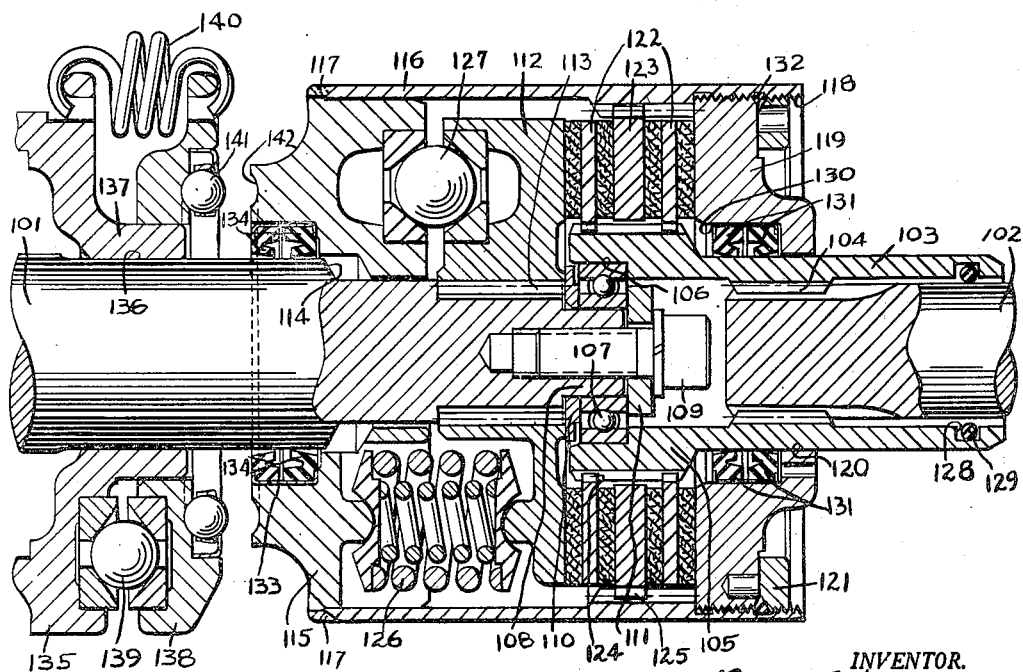
Figure 7 is a longitudinal sectional view taken centrally of the modified clutch shown in Figure 6, and also showing a portion of one means for actuating the clutch.

In Figures 6 and 7, there is shown a modified form of clutch which will now be described.

Referring particularly to Figure 7, there is shown a pair of shafts 101, 102 disposed in axial alignment and constituting torque input and torque output shafts, it being immaterial which shaft is the input shaft, this depending solely upon the installation in which the clutch is incorporated. Adapted to be mounted on the shaft 102 is a hollow clutch shaft 103, these shafts 102, 103 being interengaged as at 104 as by mating splines so as to be rotatable in unison. The inner end of the clutch shaft 103 is formed with an enlarged hub 105 having an enlarged recess 106 adapted to receive a suitable anti-friction bearing 107 therein, the shaft 101 having a reduced end 108 adapted to fit within the inner race of the bearing 107. The shaft 101 at its inner end is preferably drilled and tapped to receive a headed screw 109 which locks the bearing 107 on the reduced end 108 of the shaft 101 by means of spacing and bearing-locking rings 110, 111, the ring 110 also acting as an abutment for a clutch pressure or backing plate 112.

The pressure or backing plate 112 has a central opening therethrough and is fixed on the shaft 101 for rotation therewith, as by means of a splined connection 113, the splined portion of the shaft 101 being of a lesser diameter than the body of the shaft, and the shaft 101 also being provided with a shoulder 114 coacting with a thrust or throw-out plate 115 for limiting plate 115 against longitudinal movement in one direction on the shaft 101 past the shoulder 114.

The throw-out plate 115 is adapted to be slidably and rotatably mounted on the outer end of the shaft 101, the throw-out plate being secured about its outer marginal edge to an open-ended housing 116, by welding or other appropriate means, as at 117. The housing 116 is longitudinally extended so as to encircle the largest part of the clutch assembly, the end of the housing 116 remote from the thrust plate 115 being preferably interiorly screw-threaded, as at 118, to receive a second clutch pressure plate 119 having a central opening 120 therethrough, the shaft 103 projecting through the opening 120. The pressure plate 119 is locked in position by a screw-threaded locking ring 121. It will be seen that the throw-out plate 115 and the shiftable pressure plate 119 form closure members for the open-ended housing 116.

Disposed intermediate the opposed pressure plates 112 and 119 is a suitable number of friction clutch discs 122, and a suitable number of clutch plates 123 arranged in interleaved relation with each other, the pair of discs 122 and the single plate 123 shown in Figure 7 being purely illustrative, since obviously any desired number of discs and plates may be utilized. The friction discs 122 are slidably mounted on the enlarged portion or hub 105 of the shaft 103 so as to be rotatable therewith by means of a plurality of splines or ribs 124 disposed in circumferentially spaced relation about the outer periphery of the hub 105, and the plate 123 is likewise slidably engaged with the inner periphery of the housing 116 so as to be rotatable therewith by means of a plurality of circumferentially spaced rib or splines 125. Thus it is seen that the interleaved discs 122 and plate 123 are axially slidable for frictional engagement with or disengagement from each other, and at the same time, they are mounted for relative rotative movements, when the housing 116 and shaft 103 rotate relative to each other, in a manner and for a purpose which will be hereinafter more fully described.

Interposed between the throw-out plate 115 and the pressure plate 112 is a suitable number of clutch spring assemblies 126 and ball and seat assemblies 127 which closely resemble the spring and ball assemblies hereinbefore described in detail and as shown in detail in Figures 2 and 5, and accordingly, no further detailed description of the structure of these elements is necessary.

However, while the spring assemblies 126 and ball and seat assemblies 127, act to energize the clutch in a manner generally similar to those hereinbefore described, the clutch shown in Figure 6 is energized in a specifically different manner due to its modified construction. The springs 126, being engaged with the relatively stationary pressure plate or spring backing plate 112, act to normally urge the thrust plate 115 to the left, as seen in Figure 7, thus moving the entire clutch housing 116 and the slidable pressure plate 119 correspondingly to the left, thereby sliding the discs 122 and the plate 123 axially into frictional engagement with each other to transmit power through the clutch. When the load on the clutch is heavy enough to cause any slippage between the discs or plates 122, 123, the housing which is rotatable with the plate 123 will rotate slightly relative to the pressure plate 112 which is mounted for rotation with the shaft 101, thus bringing the socalled servo action of the ball and seat assemblies 127 into effect by causing the balls to ride up the opposite sides of the inclined seats and supplementing the pressure of the spring assemblies to positively move the thrust plate 115 further to the left, with consequent increased application of pressure by the movable pressure plate 119 against the discs or plates 122, 123, thereby substantially increasing the torque capacity of the clutch.

Suitable actuating means may be provided for engagement with the thrust plate 115 to force the same to the right as seen in Figure 7, for shifting the housing 116 and pressure plate 119 to the right against the pressure of the springs and the force of the ball assemblies 127, thereby causing the balls to seat in the deepest part of their seats and relieving all pressure between the pressure plates 112 and 119, thus rendering the clutch free or disengaged, as will be hereinafter described.

It is apparent that the friction discs and plate 122, 123, respectively, when interengaged for rotation with the clutch shaft 103 and the housing 116, and the opposed pressure plates 112, 119, constitute means for establishing driving relation between the clutch shaft and the shaft 101, this arrangement being similar in function to the friction discs and plates 31, 30, the opposed pressure plates 23, 42 and the annular member 27 of the embodiment shown in Figures 1 to 5 for establishing driving relation between the clutch shaft 18 and the power shaft 5, as hereinbefore described.

For sealing the interior of the clutch of Figures 6 and 7, and more particularly the discs 122 and the plate 123, against the admission of oil or other fluids when the clutch is installed in an oil-containing transmission housing, or in some other fluid environment, I have provided a number of fluid seals, the location and arrangement of which will now be described.

Adjacent to the outer or righthand end of the shaft 103, as seen in Figure 7, an annular groove 128 is formed about the inner periphery thereof, and a resilient O-ring 129 or other suitable seal is snapped into the groove 128 for sealing engagement with the shaft 102 when the clutch is installed. The movable pressure plate 119 is provided with an enlarged recess 130 which is coaxial with the opening 120 therethrough, and a suitable resilient fluid seal 131 is pressed into the recess 130 for sealing engagement with the external peripheral surface of the clutch shaft 103. For sealing the connection between the pressure plate 119 and the housing 116, the contiguous marginal edges of the pressure plate 119 and the locking ring 121 are adapted to clamp a resilient O-ring seal 132 therebetween.

The thrust plate 115 is also provided with an enlarged recess 133 into which is pressed a suitable resilient seal 134, this seal 134 being adapted to engage the shaft 101 when the clutch is installed to prevent the passage of oil into the clutch housing.

Thus the seals 129, 131, 132 and 134, in conjunction with the closure plates 115, 119 at opposite ends of the housing 116, effectively seal the clutch at every possible point of entry of oil or other fluid, thereby enabling and maintaining dry operation of the clutch when it is installed in an environment of fluid, such as is present in an oil-containing transmission housing, a pump housing, or the like.

The means for actuating the clutch disclosed in Figures 6 and 7, as shown in Figure 7, preferably comprises a stationary support 135 having a central opening 136 therethrough, this support 135 being adapted to be fixedly connected to a stationary portion of a transmission housing or other adjacent structure (not shown), with the shaft 101 extending through the opening 136. The support 135 is provided with an axially extended bearing portion or hub 137 on which is supported a disc-like member 138.

Interposed between the support 135 and the disc 138 is a suitable number (two or more) of circumferentially spaced ball and seat assemblies 139 which are similar in structure and function to the ball-camming means hereinbefore described. For interconnecting the support 135 and the disc 138 and resiliently biasing the same towards each other is a suitable number (two or more) of equidistantly spaced tension springs 140 or the like. The disc 138 is adapted to be connected to a suitable actuator arm, link or other suitable operating means (not shown) for rocking the disc 138 in opposite directions on the bearing 136 about its central axis and relative to the stationary support 135, this rocking movement in one direction causing the balls 139 to ride up the oppositely inclined seats therefor to thereby shift the disc 138 axially away from the support 135 and into clutch-disengaging relation with the thrust or throw-out plate 115 of the clutch.

Carried by the disc 138 is a suitable anti-friction thrust bearing 141 which is adapted to engage the thrust plate 115 of the clutch for disengaging the clutch as hereinbefore described. In the illustrative embodiment, the bearing 141 is shown as being a ball bearing assembly, and therefore, the thrust plate 115 is provided with an annular track or groove 142 in which the balls may travel when the clutch is being disengaged. It should be understood, however, that the bearing 141 may have any other suitable form such as an annular thrust washer, and the thrust plate 115 will be constructed in accordance with the type of thrust bearing utilized.

The actuator means just described is merely illustrative of one suitable type which may be employed to effect release and engagement of the clutch at will, and it is to be understood that other actuators may be employed, if preferred, since the clutch invention is not limited to use with any specific type of actuator as shown in the illustrative embodiment or otherwise.

While the specific details of the invention have been herein shown and described, the invention is not confined thereto, since changes and alterations may be made without departing from the spirit thereof as defined in the appended claims.

I claim:

1. A clutch of the class described adapted to be operatively interposed between a rotary power input member and a rotary power output member, comprising a rotatable housing, a clutch shaft extending into said housing and adapted to be operatively connected to one of said rotary members for rotation therewith, a backing plate and a pressure plate having friction surfaces disposed in opposed relation within said housing, said plates being relatively shiftable axially and rotatively with respect to each other, said backing plate being adapted to be fixedly mounted on the other of said rotary members for rotation therewith, said pressure plate being carried by said housing and rotatable therewith, friction members cooperatively interengaged with said housing and with said clutch shaft for transmitting torque between said clutch shaft and the backing plate when the friction members are engaged, and throw-out means rigidly connected with said housing for shifting said housing so as to relatively shift said plates away from each other to disengage the clutch, said throw-out means being adapted to be slidably supported on one of the rotary members aforesaid, and means interposed between said throw-out means and one of said backing plate for shifting said housing so as to relatively shift said plates towards each other to engage the clutch.

2. A sealed dry clutch of the class described adapted to be operatively interposed between a rotary power input member and a rotary power output member, comprising a rotatable housing, a clutch shaft extending into said housing and adapted to be operatively connected to one of said rotary members for rotation therewith, a backing plate and a pressure plate having friction surfaces disposed in opposed relation within said housing, said plates being relatively shiftable axially and rotatively with respect to each other, said backing plate being adapted to be fixedly mounted on the other of said rotary members for rotation therewith, said pressure plate being carried by said housing and rotatable therewith, friction members cooperatively interengaged with said housing and with said clutch shaft for transmitting torque between said clutch shaft and the backing plate when the friction members are engaged, and throw-out means rigidly connected with said housing for shifting said housing so as to relatively shift said plates away from each other to disengage the clutch, said throw-out means being adapted to be slidably supported on one of the rotary members aforesaid, and fluid sealing means sealing said housing, said clutch shaft, and said throw-out means against the entry of a fluid medium into said housing.

3. A sealed dry clutch as defined in claim 2, wherein the means for sealing said housing comprises a sealing member carried by said clutch shaft and adapted to sealingly engage one of said rotatable members, a sealing member interposed between said clutch shaft and said shiftable pressure plate, a sealing member interposed between said shiftable pressure plate and said housing, and a sealing member carried by said throw-out means and adapted to sealingly engage the other of said rotary members.

4. A sealed dry clutch of the class described adapted to be operatively interposed between a rotary power input member and a rotary power output member, comprising a rotatable and axially movable housing, a clutch shaft adapted to be operatively connected to one of said power members for rotation therewith, a backing plate and a relatively axially and rotatively shiftable pressure plate having friction surfaces disposed in opposed relation within said housing, said backing plate having means adapted to operatively connect the same to the other of said power members for rotation therewith, said pressure plate being carried by said housing and being rotatively and slidably positioned on said clutch shaft, friction means cooperatively interengaged with said clutch shaft and said housing for transmitting power between the power members aforesaid when said friction means are engaged, means for selectively shifting said housing to shift said plates relatively towards and away from each other for engaging and disengaging said friction means, and means engageable with said clutch shaft and with said power members for sealing said clutch against the entry of fluid into the housing.

5. A sealed dry clutch as defined in claim 4, wherein the means for relatively shifting the pressure and backing plates comprises a throw-out plate forming a closure for one end of the housing and adapted to be rotatably and slidably positioned on one of said power members, and the sealing means comprises a fluid sealing member carried by said throw-out plate and adapted to sealingly engage the power member on which the throw-out plate is positioned.

6. A sealed dry clutch as defined in claim 4, wherein the pressure plate forms a closure for one end of the housing aforesaid, and the sealing means comprises a fluid seal disposed in sealing relation between said clutch shaft and said closure.

7. A sealed dry clutch as defined in claim 4, wherein the housing is open at its opposite ends and the means for relatively shifting the pressure and backing plates comprises a throwout plate forming a closure for one end of said housing, the pressure plate forming a closure for the opposite end of said housing, and the sealing means comprisee a fluid seal carried by one of said closures and adapted to sealingly engage one of said power members, and a fluid seal interposed between the other of said closures and the clutch shaft aforesaid.

8. A friction device of the class described adapted to be connected to a pair of relatively rotatable members, comprising a rotatable and axially shiftable housing, a shaft extending into said housing adapted to be connected to one of said members, a backing plate and a relatively rotatable and axially shiftable pressure plate having friction surfaces disposed in opposed relation within said housing, said backing plate being adapted to be connected to the other member, said pressure plate being carried by said housing and being slidably and rotatably mounted on said shaft, friction means cooperatively interengaged with said housing and said shaft and disposed between said plates, a throw-out plate carried by said housing and adapted to be shiftably mounted on the rotatable member on which said backing plate is adapted to be mounted, means operative upon said throw out plate to shift said housing axially for relatively shifting said pressure and backing plates towards each other into frictional engagement with said friction means, for frictionally holding said housing and said shaft against relative rotation, and means operative upon said throw-out plate for relatively shifting said pressure and backing plates apart.

9. A friction clutch of the class described, comprising a clutch shaft adapted to be mounted on a rotary member, a housing encircling said clutch shaft, a pressure plate carried by said housing and slidably mounted on said clutch shaft, a backing plate within said housing and adapted to be connected to a second rotary member, friction disc means engaged with said housing and with said clutch shaft between said plates, a throw-out plate fiexd to said housing, resilient means intermediate said throw-out plate and the backing plate for spreading said plates apart to shift said housing axially and press the friction disc means between the pressure and backing plates, so as to transmit torque between said rotary members, camming means also intermediate said throw-out plate and the backing plate for positively forcing said throw-out and backing plates apart, responsive to relative rotation of said plates, and means for shifting said throw-out plate towards the backing plate to shift the housing axially and release the friction disc means from pressure between said pressure and backing plates.

References Cited in the file of this patent

UNITED STATES PATENTS

| | | |
|---|---|---|
| 710,759 | Coleman et al. | Oct. 7, 1902 |
| 840,626 | Huff | Jan. 8, 1907 |
| 974,101 | McGee | Oct. 25, 1910 |
| 1,011,174 | Eckhard | Dec. 12, 1911 |
| 1,101,697 | Hewitt | June 30, 1914 |
| 1,134,699 | Scofield | Apr. 6, 1915 |
| 1,159,663 | Guillery | Nov. 9, 1915 |
| 1,170,784 | Sunden | Feb. 8, 1916 |
| 1,260,599 | Tuttle | Mar. 26, 1918 |
| 1,493,513 | Zisker | May 13, 1924 |
| 2,230,520 | Wemp | Feb. 4, 1941 |
| 2,394,331 | Roche | Feb. 5, 1946 |
| 2,407,022 | Lambert | Sept. 3, 1946 |
| 2,496,201 | Dodge | Jan. 31, 1950 |
| 2,506,920 | Ginn et al. | May 9, 1950 |
| 2,529,400 | Lapsley | Nov. 7, 1950 |
| 2,632,543 | Wilson | Mar. 24, 1953 |

FOREIGN PATENTS

| | | |
|---|---|---|
| 79,584 | Switzerland | Dec. 2, 1918 |
| 93,164 | Switzerland | Feb. 16, 1922 |